(12) United States Patent
Mifune et al.

(10) Patent No.: US 7,555,729 B2
(45) Date of Patent: Jun. 30, 2009

(54) SIGNAL BEARING MEDIUM BEARING IMAGE DISPLAY PROGRAM AND IMAGE DISPLAY APPARATUS

(75) Inventors: Eiji Mifune, Osaka (JP); Katsushi Horihata, Osaka (JP); Masayoshi Suzuki, Osaka (JP)

(73) Assignee: Kyocera Mita Corporation (JP)

( * ) Notice: Subject to any disclaimer, the term of this patent is extended or adjusted under 35 U.S.C. 154(b) by 373 days.

(21) Appl. No.: 11/319,891

(22) Filed: Dec. 28, 2005

(65) Prior Publication Data
US 2006/0143153 A1    Jun. 29, 2006

(30) Foreign Application Priority Data
Dec. 28, 2004   (JP)   ............................. 2004-381697

(51) Int. Cl.
    G06F 3/048   (2006.01)
(52) U.S. Cl. .......................................... 715/838; 707/1
(58) Field of Classification Search ................ 707/1; 715/838
    See application file for complete search history.

(56) References Cited

U.S. PATENT DOCUMENTS

| | | | | |
|---|---|---|---|---|
| 5,590,317 | A * | 12/1996 | Iguchi et al. ................... | 707/2 |
| 5,619,594 | A * | 4/1997 | Melen ........................ | 382/233 |
| 6,360,252 | B1 * | 3/2002 | Rudy et al. ................. | 709/206 |
| 6,782,402 | B1 * | 8/2004 | Hidaka et al. ............... | 707/203 |
| 6,810,404 | B1 * | 10/2004 | Ferguson et al. ............ | 707/200 |
| 6,900,819 | B2 * | 5/2005 | Marshall et al. ............. | 345/667 |
| 7,047,238 | B2 * | 5/2006 | Tada et al. ................... | 707/5 |
| 7,272,258 | B2 * | 9/2007 | Berkner et al. .............. | 382/176 |
| 2003/0122940 | A1 * | 7/2003 | Myojo ..................... | 348/231.2 |
| 2005/0276519 | A1 * | 12/2005 | Kitora et al. ................ | 382/305 |
| 2007/0288442 | A1 * | 12/2007 | Iwayama et al. ............... | 707/3 |

FOREIGN PATENT DOCUMENTS

JP   2004-185278   7/2004

OTHER PUBLICATIONS

"System to perform optical character recognition on images stored on a memory card inserted into an all-in-one device", Research Disclosure No. 492072, published in Apr. 2005, pp. 1-3.*
"The AMICO Library Content Profile", web archive of http://ww.amico.org/AMICOlibrary/content.html, published Feb. 10, 2003, pp. 1 & 2.*

* cited by examiner

*Primary Examiner*—Doug Hutton
*Assistant Examiner*—Gregory A DiStefano
(74) *Attorney, Agent, or Firm*—Gerald E. Hespos; Anthony J. Casella

(57) ABSTRACT

A reduced image generation portion generates a reduced image indicating the content of a file stored in a storage device. When a judgment portion judges that text data, which is the file in text format, is attached to the file, a display image generation portion generates a display image indicating the attachment of the text data to the file. A display control portion then displays the images generated by the reduced image generation portion and the display image generation portion on a display as one thumbnail image. Meanwhile, when the text data is not attached to the file, the display control portion displays the reduced image generated by the reduced image generation portion as the thumbnail image.

12 Claims, 10 Drawing Sheets

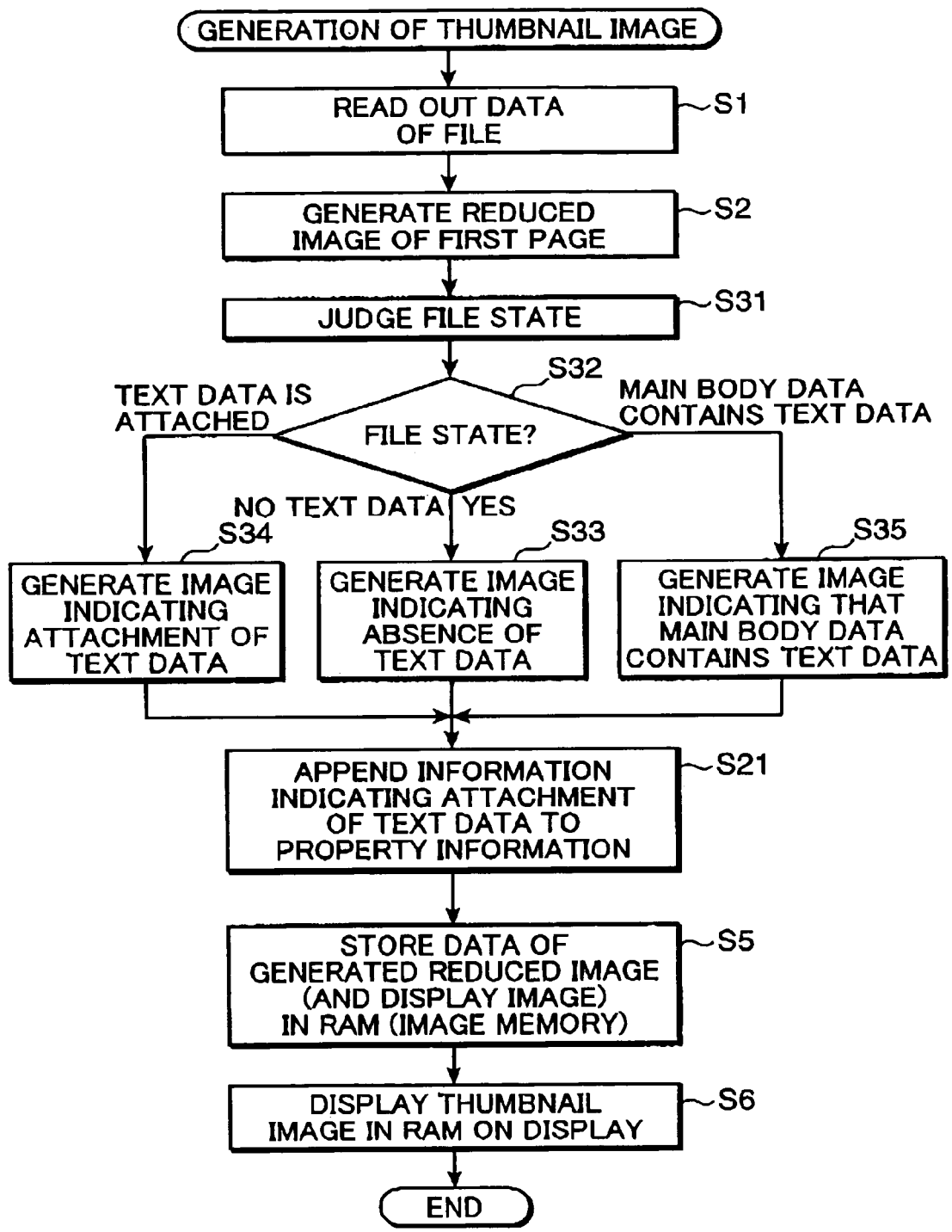

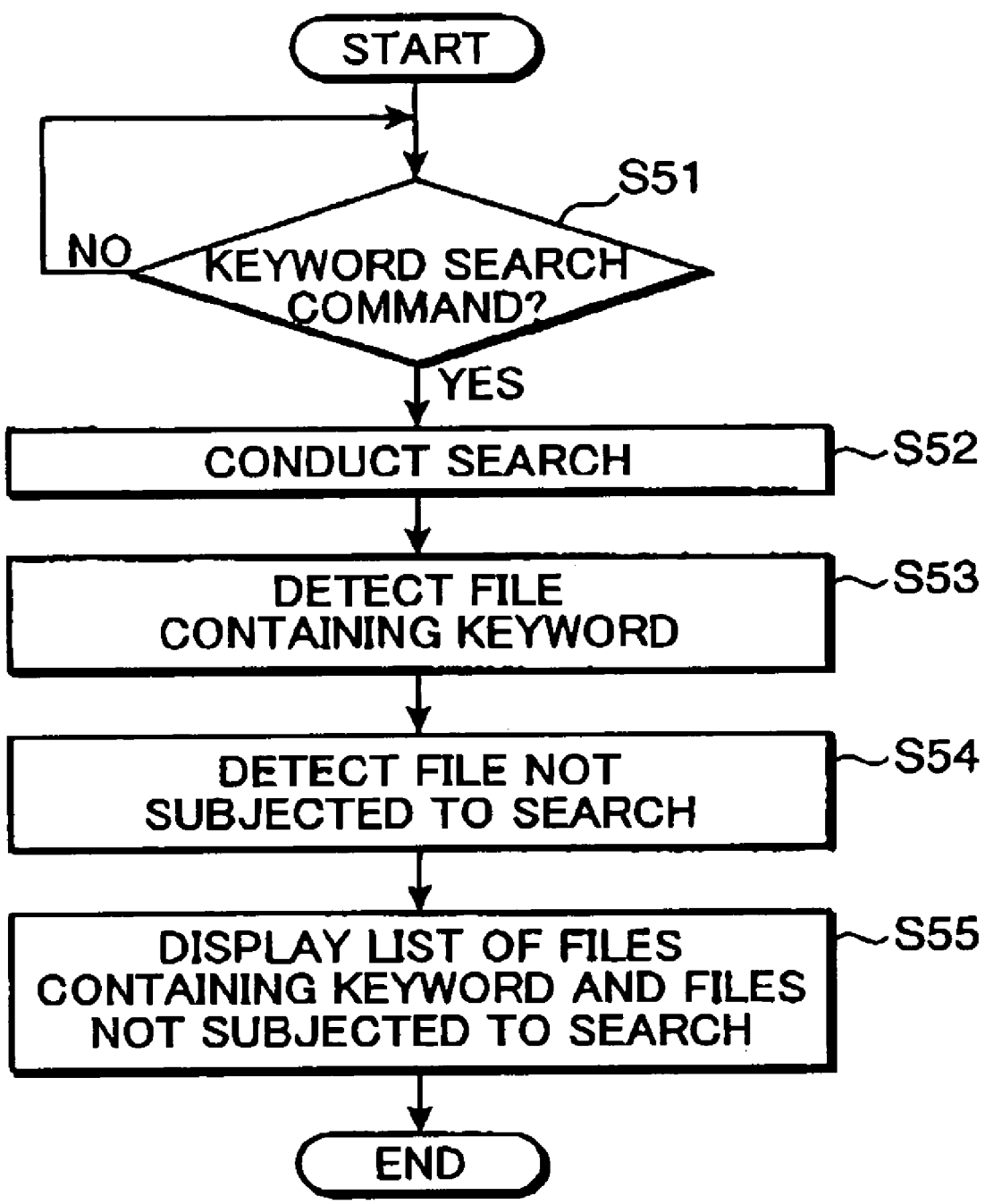

SIGNAL BEARING MEDIUM BEARING IMAGE DISPLAY PROGRAM AND IMAGE DISPLAY APPARATUS

BACKGROUND OF THE INVENTION

1. Field of the Invention

The present invention relates to a signal bearing medium bearing an image display program to display the content of a file stored in a data storage device or a storage medium in a thumbnail view, and to an image display apparatus.

2. Description of the Background Art

An image display program to display the contents of image data files of documents read by a scanner or files corresponding to respective applications in a thumbnail view or to display the applications correlated with the files has been proposed. There is also an image display program to further convert image data (JPEG data, BMP data, etc.) to text data using the OCR (Optical Character Reader) function and store the text data in a database as search data, so that the user is able to conduct search to find whether a keyword he/she specifies is contained in the files.

Also, as a document management program to make it easier for the user to recognize the contents of files by showing the files saved in the storage device in a thumbnail view, there is a program as disclosed in Japanese Unexamined Patent Publication No. 2004-185278 to display the number of document pages of each file in a thumbnail view and which document page is shown in the thumbnail view together with a corresponding thumbnail image.

In the case of the programs in the related art, however, it is not shown whether each file displayed in the thumbnail view is a file that has been converted to data in text format by the OCR function and is therefore in a keyword searchable state. Hence, by merely looking at the thumbnail image, the user is unable to judge whether a file in question should be converted to text data using the OCR function to bring the file in a keyword searchable state or whether the file in question is already in a keyword searchable state and does not have to be converted to text data.

SUMMARY OF THE INVENTION

It is an object of the present invention to provide an image display technology which is free from the problems residing in the prior art.

It is another object of the present invention to provide a signal bearing medium bearing an image display program which enables the user to readily understand whether a file stored in a storage device or the like has been converted to text data and is therefore in a keyword searchable state, and an image display apparatus.

According to an aspect of the invention, display of a thumbnail image is executed by generating a reduced image indicating a content of a file stored in a storage portion of a computer or a storage medium readable by the computer; judging based on the aspect of presence of text data in the file which state the file is in; generating a display image indicating a state of the file; and displaying a reduced image and/or a file state image, or a combination of a reduced image and a file state image in accordance with the judged file state.

These and other objects, features, aspects, and advantages of the present invention will become more apparent from the following detailed description of the preferred embodiments/examples with reference to the accompanying drawings.

BRIEF DESCRIPTION OF THE DRAWINGS

FIG. 3 is a flowchart showing a processing to generate a thumbnail image of a file stored in a storage device or the like;

FIG. 7 is a flowchart showing another processing to generate a thumbnail image;

FIG. 9 is a flowchart showing a keyword search processing; and

DETAILED DESCRIPTION OF THE PREFERRED EMBODIMENT OF THE INVENTION

Hereinafter, an image display program and an image display apparatus according to an embodiment of the invention will be described with reference to the drawings. The image display program causes a computer to function as an image display apparatus when installed in a storage device, such as an HDD (hard disc) provided to the computer.

Figure 1:
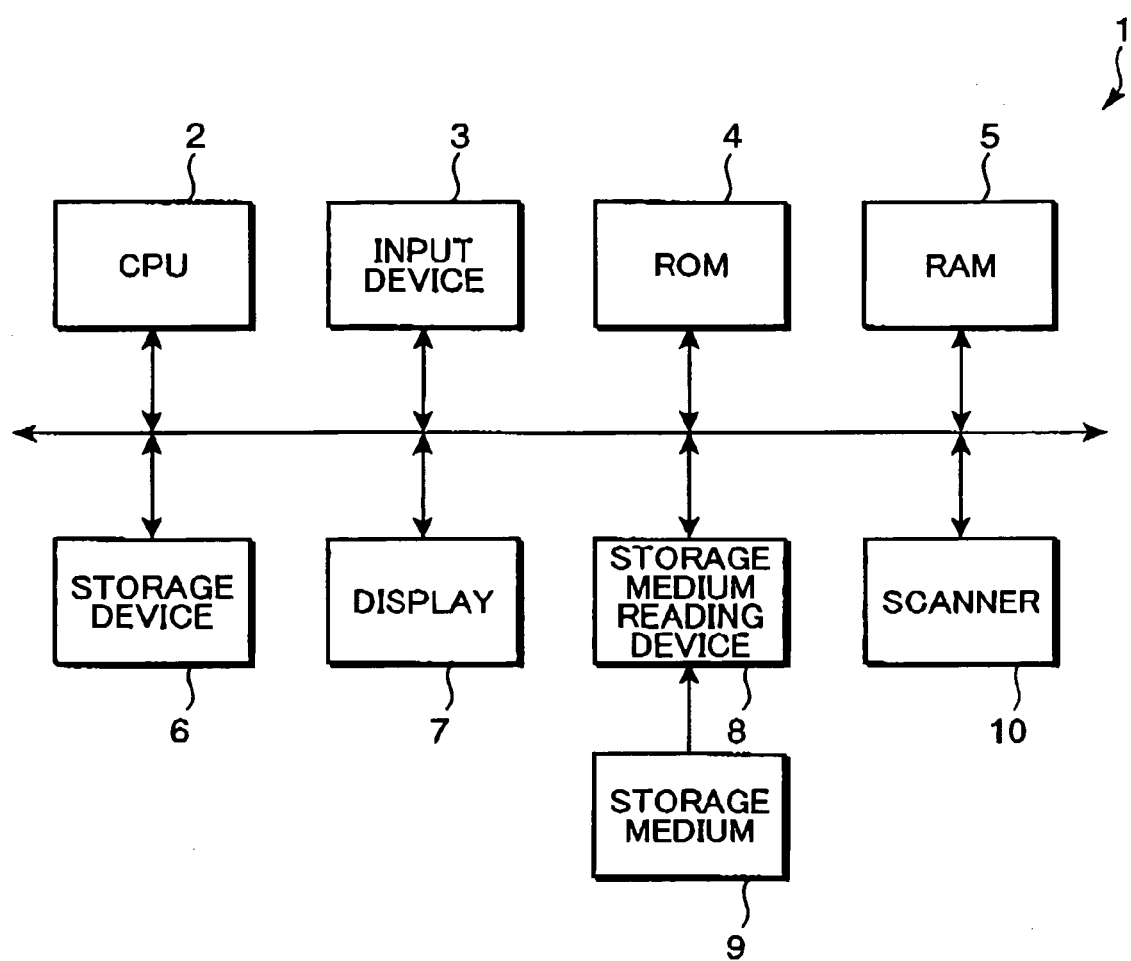
FIG. 1 is a block diagram schematically showing a configuration of an image display apparatus according to an embodiment of the invention.

FIG. 1 is a block diagram schematically showing a configuration of the image display apparatus. The image display apparatus 1 shown in FIG. 1 comprises a personal computer or the like. The image display apparatus 1 is provided with a CPU 2 that is responsible for the operation control of the entire device. An input device 3, a ROM 4, a RAM 5, a storage device 6, a display 7, a storage medium reading device 8, and a scanner 10 are connected to the CPU 2 via an internal bus. Various kinds of data are transmitted among theses components via the internal bus under the control of the CPU 2 for various kinds of processing to be performed.

The input device 3 comprises a keyboard, a mouse, etc., and is used to input various manipulation commands by the user. The ROM 4 stores the system program and the like for the operation control of the entire device. The storage device (storage portion) 6 comprises a hard disc drive or the like, and stores the image display program and various files that need to be saved. The CPU 2 reads out the image display program from the storage device 6 and performs and controls the operations as respective portions shown in FIG. 2 described below by performing processing according to the program. The RAM 5 is used as a work area of the CPU 2. The display (display portion) 7 comprises a CRT, a liquid crystal display apparatus or the like, and displays various screens under the control of the CPU 2.

The image display program is stored in a storage medium (signal bearing medium) 9, such as CD-ROM and an FD. The image display program is read out from the storage medium 9 by the storage medium reading device 8 comprising a disc drive or the like and stored in the storage device 6. When the image display apparatus 1 is connected to another computer via a network, the image display program may be downloaded from this connected-computer via the network.

It should be noted that in general, the routines executed to implement the embodiment of the invention, whether implemented as part of an operating system or a specific application, component, program, object, module or sequence of instructions will be referred to as "programs". The program comprises one or more instructions that are resident at various times in various memory and storage devices in a computer, and that cause the computer to perform the steps necessary to execute steps or elements embodying the various aspects of the invention.

The embodiment of the invention has and will be described in the context of functioning the computer and computer system. However, those skilled in the art will appreciate that various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links including the internet.

The scanner 10 reads an image on the document and converts the image into electronic data, so that it can be saved as image data. As has been described, it can be achieved as the image display apparatus 1 either in the form of an image display program or a storage device recorded with the image display program.

Figure 2:
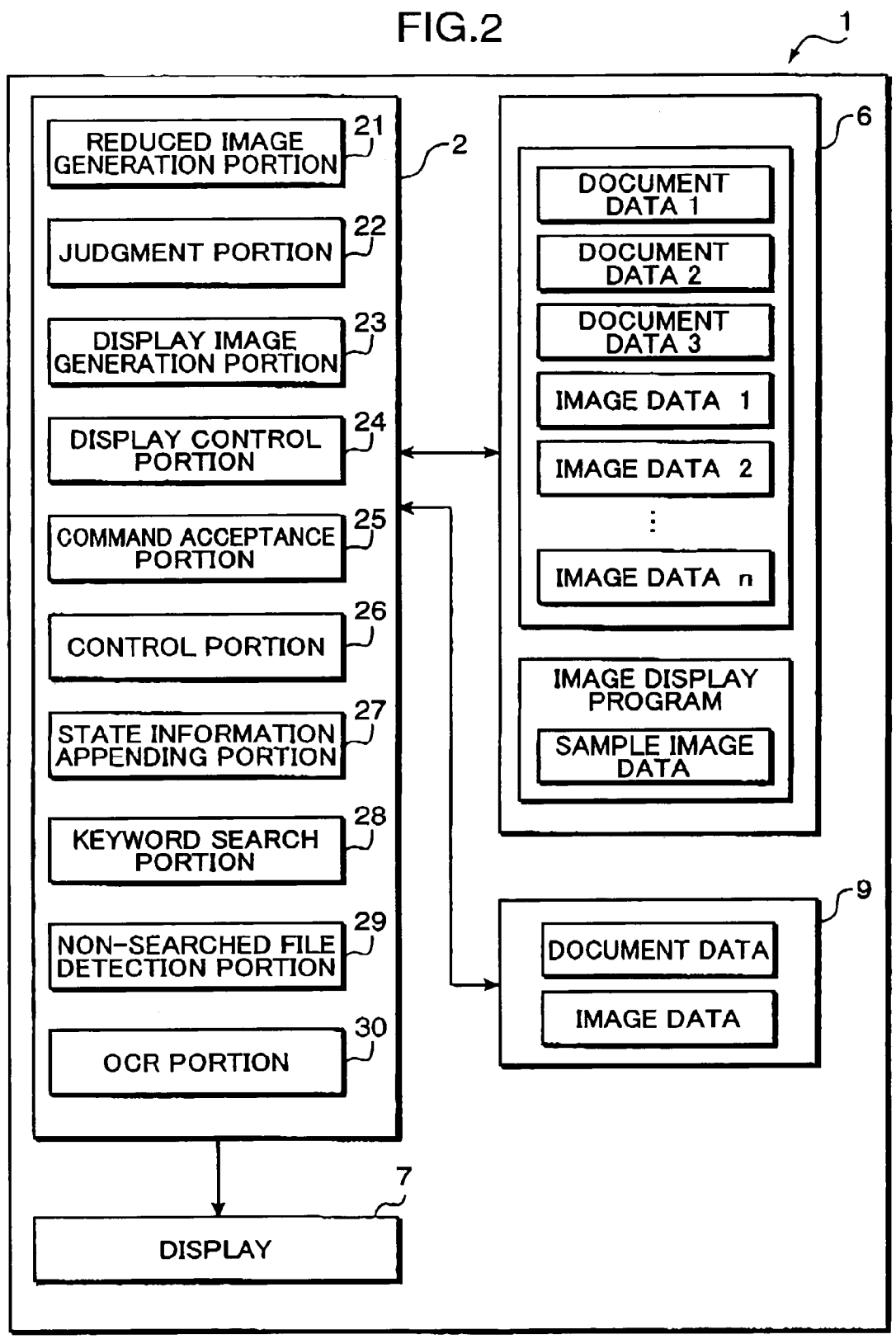
FIG. 2 is a block diagram showing major functions of the image display apparatus.

Major functions of the image display apparatus 1 configured as above will now be described. FIG. 2 is a block diagram showing major functions of the image display apparatus 1. As shown in FIG. 2, in the image display apparatus 1, the CPU 2 functions as a program execution portion according to the image display program stored in the storage device 6. PDF or JPEG image data and data in document format corresponding to various applications (hereinafter, referred to as the document data) stored in the storage device 6 are the data to be read out. The data to be read out may be the data stored in a storage medium readable by the recording medium reading device 8 in the image display apparatus 1.

The CPU 2 functions as all the following portions according to commands of the image display program in the storage device 6: a reduced image generation portion 21, a judgment portion 22, a display image generation portion 23, a display control portion 24, a command acceptance portion 25, a control portion 26, a state information appending portion 27, a keyword search portion 28, a non-searched file detection portion 29, and an OCR portion 30.

The reduced image generation portion (reduced image generation portion) 21 reads out files (document data, image data, etc.) stored in the storage medium 9 or the storage device 6 and generates reduced images indicating the contents of the respective files. It is more preferable to read out the property information (information about the file name of each file, the kind of application used to open the file, etc.) attached to each file, and reflect the read information on the corresponding reduced image.

The judgment portion (judgment portion and file state judgment portion) 22 makes a judgment on a file stored in the storage device 6 or the storage medium 9 as to whether text data, which is the file in text format, is attached to the file. Also, the judgment portion 22 makes a judgment on a file stored in the storage device 6 or the storage medium 9 as to (1) whether the text data, which is the file in text format, is contained in data constituting the main portion of the file (hereinafter, referred to as the main portion data), and (2) whether neither the text data, which is the file in text format, is attached to the file, nor the text data is contained in the main portion data. For example, when the data of the file is PDF data or data for the word processor application, there is a case where the main portion of the file contains text data, and (1) is checked to judge such a state.

The display image generation portion (display image generation portion and state display image generation portion) 23 generates a display image (an image having a small data size and forming part of a thumbnail image) indicating the attachment of the text data when the judgment portion 22 judges that the text data is attached to the file. Further, the display image generation portion 23 generates a file state display image (an image having a small data size and forming part of the thumbnail image) showing one of the following states judged by the judgment portion 22; (1) the text data is attached to the file; (2) the text data is contained in the main portion data of the file; and (3) neither the text data is attached to the file nor the text data is contained in the main portion data of the file. These display images are generated using sample image data in the image display program.

When the judgment portion 22 judges that the text data is attached to the file, the display control portion (display control portion, search result display control portion, and detection result display control portion) 24 displays the reduced image generated by the reduced image generation portion 21 and the display image generated by the display image generation portion 23 on the display 7 as one thumbnail image. When the judgment portion 22 judges that the text data is not attached to the file, the display control portion 24 displays the reduced image generated by the reduced image generation portion 21 as the thumbnail image.

Further, when the file state display image is generated by the display image generation portion 23, the display control portion 24 displays the file state display image and the reduced image generated by the reduced image generation portion 21 on the display 7 as one thumbnail image.

The display control portion 24 also displays a list of the thumbnail images of files found to contain a keyword specified by the operator through a search conducted by the keyword search portion 28 described below, and further a list of the thumbnail images of files not subjected to the search and detected by the non-searched file detection portion 29.

The command acceptance portion 25 accepts a command on the basis of operator's manipulations on the input device 3 (mouse pointer, etc.). In this embodiment, the command acceptance portion 25 accepts a command to specify whether part of the thumbnail image is specified, more specifically, either the reduced image portion or the display image portion is specified, and an input of a keyword that the user wishes to be searched for when the keyword search by the keyword search portion 28 is performed.

When the display image portion in the thumbnail image displayed on the display 7 by the display control portion 24 is specified by the command acceptance portion 25, the control portion (control portion) 26 performs control so that the content of the text data attached to the file is displayed. When the reduced image portion is specified by the command acceptance portion 25, the control portion 26 performs control so that the content of the data forming the main portion of the file is displayed.

When the judgment portion 22 judges that the text data is attached to the file or when the text data is contained in the main portion data of the file, the state information appending portion (state information appending portion) 27 appends information indicating that the text data is attached to or contained in the file to the property information or the file name information of the file.

The keyword search portion (keyword search portion) 28 conducts a search to find whether the keyword inputted by the operator using the input device 3 is contained in the text data contained in the main portion data of the file or the text data attached to the file.

The non-searched file detection portion (non-searched file detection portion) 29 detects files not subjected to the search conducted by the keyword search portion 28.

The OCR (Optical Character Reader) portion 30 analyses characters contained in data read by the scanner 10 in the form an image and converts the data to character data in text format (text data). The OCR portion 30 stores the converted text data by appending the converted text data to the original file or by storing the converted text data in a storage region different from a region where the original file is stored in correlation with the original file.

Figure 3:
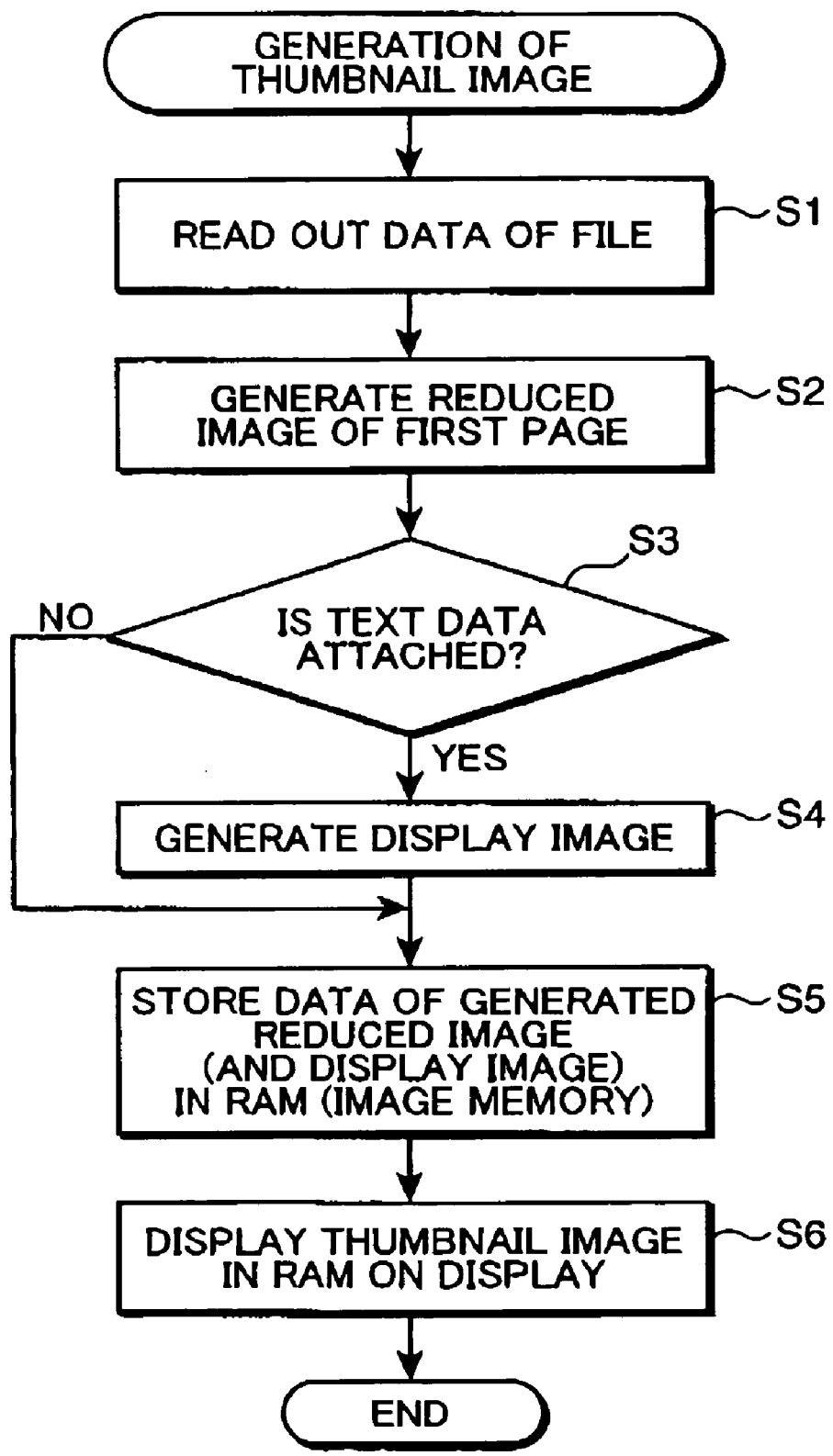
Figure 4A:
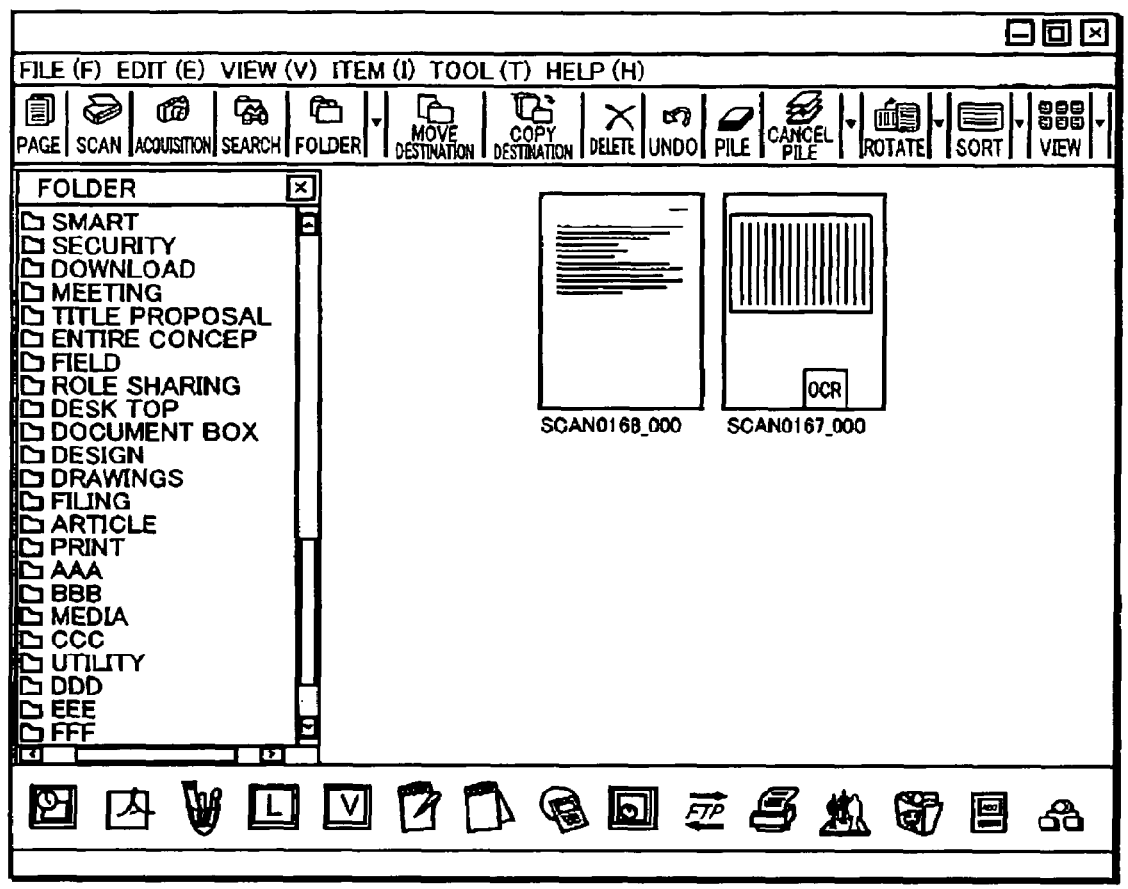
FIG. 4A is a view showing a state where a list of files is displayed on a display in a thumbnail view.
Figure 4B:
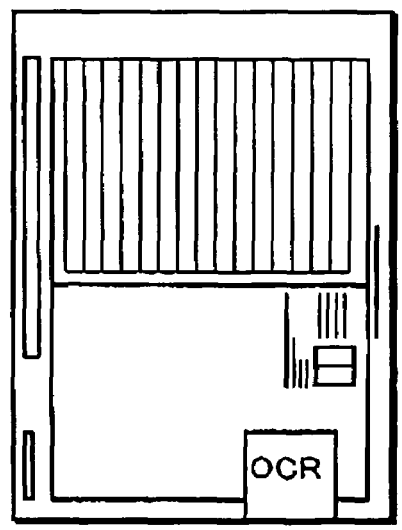
FIG. 4B is an enlargement view of a thumbnail image.

A processing to generate thumbnails of files stored in the storage device 6 or the like will now be described. FIG. 3 is a flowchart showing a processing to generate thumbnail images of the files stored in the storage device 6 or the like. FIG. 4A is a view showing the state where a list of the files are displayed on the display 7 in a thumbnail view. FIG. 4B is an enlargement view of a thumbnail image. The thumbnail image is an image of a small file size showing the content of a corresponding file, and displayed when a list of the files stored in the storage device 6 or the like is displayed. In this embodiment, the thumbnail image is, for example, made of a reduced image that shows the content of the file in a reduced scale. When the text data is attached to the file, the thumbnail image is made of the reduced image and the display image indicating the attachment of the text data to the file.

When generation processing of the thumbnail image is performed, the reduced image generation portion 21 reads out the data of a file stored in the storage device 6 or the like (S1). In this instance, when the file contains more than one page, it reads out the data of the first page. The reduced image generation portion 21 then generates a reduced image by reducing an image of the data thus read to a specific size (S2). The judgment portion 22 judges whether the text data (for example, data converted by the OCR portion 30) is attached to the file for which the thumbnail image is being generated (S3). The judgment portion 22 may judge the attachment of the text data by checking whether the text data is actually attached to the file or by checking whether information indicating the absence or presence of the text data is attached to the file. For example, the judgment may be made by checking whether the property information of the file contains information indicating the absence or presence of the text data in the file.

When the text data is attached to the file (YES in S3), the display image generation portion 23 generates a display image indicating the attachment of the text data to the file (S4). The display control portion 24 stores the data of the generated reduced image and the data of the display image when the display image is generated as the data of a thumbnail image in the RAM 5 (image memory) (S5), and controls the display 7 to display the resulting thumbnail image (S6). The processing described above is performed for each file stored in the storage device 6 or the like.

In this manner, as is shown in FIG. 4A, the display control portion 24 displays the thumbnail images of all the files stored in the storage device 6 or the like. For example, for a file attached with the text data converted by the OCR portion 30, as is shown in FIG. 4B, the display image indicating being the OCRed data and the attachment of the text data is displayed as part of the thumbnail image. In FIG. 4B, the display image showing characters, "OCR", is used to let the user recognize the attachment of the text data.

When the text data, which is the file in text format, is attached to the file, the reduced image indicating the content of the file and the display image indicating the attachment of the text data are displayed on the display 7 of the image display apparatus 1 as one thumbnail image. The user is therefore able to understand that the text data is attached to the file the instant he looks at the thumbnail image.

Figure 5:
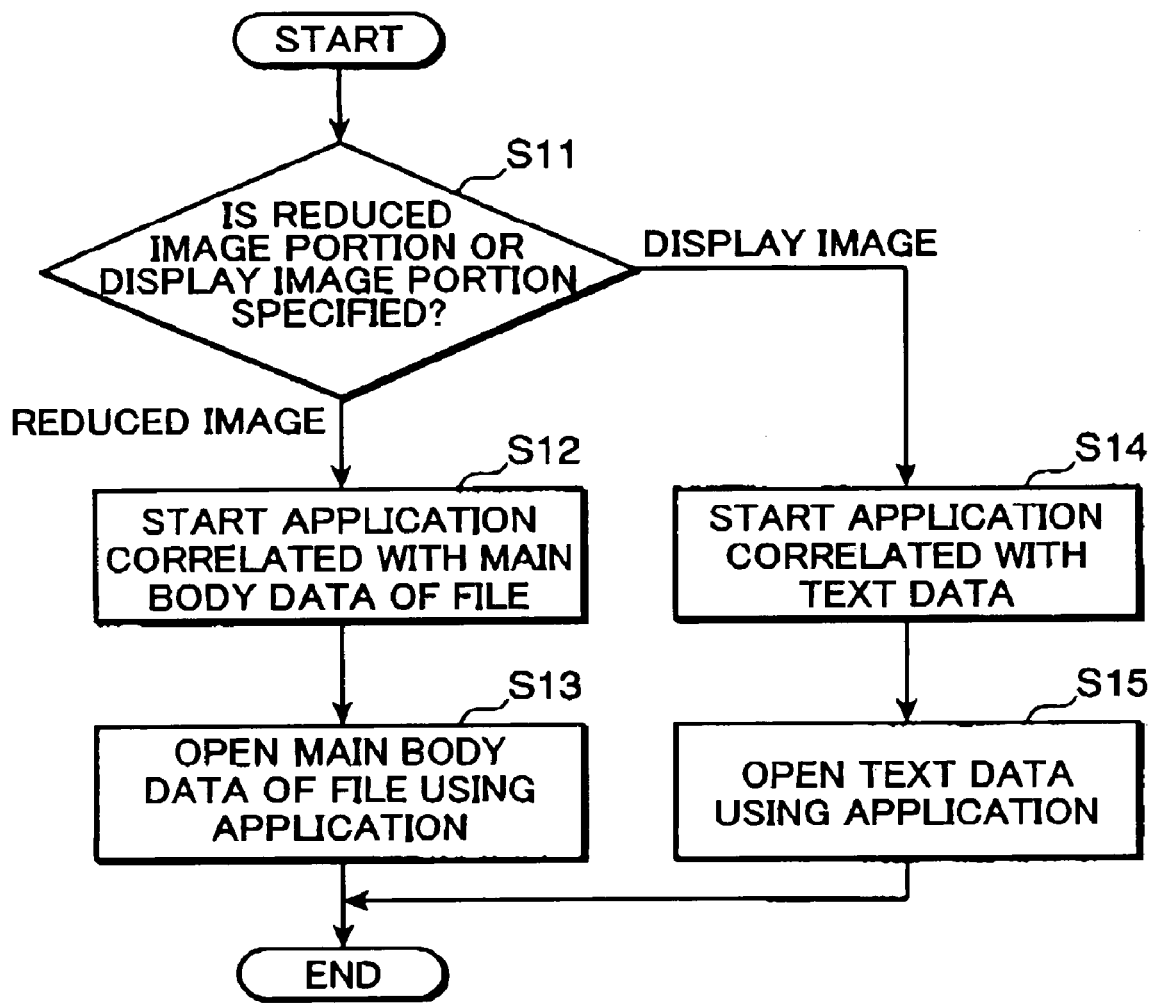
FIG. 5 is a flowchart showing a processing to make the display content different depending on which portion of the thumbnail image is specified by the user's manipulation on an input device.

A processing to make the display content different depending on which portion of the thumbnail image is specified by the user's manipulation on the input device 3 will now be described. FIG. 5 is a flowchart showing this processing. When the user manipulates the input device 3 on the thumbnail image displayed as an icon, for example, when he double clicks the mouse pointer on the icon, the correlated application is started and the data in the double clicked file is opened. It should be noted, however, that the image display program and the image display apparatus make the content of data to be displayed different by starting different applications depending on which portion of the thumbnail image is specified.

When the user specifies a thumbnail image by double clicking the mouse pointer and this command is accepted, the control portion 26 judges which portion of the thumbnail image is specified by the user's manipulation (S11). When the reduced image portion of the thumbnail image indicating the content of the main portion data of the file is specified (reduced image in S11), the control portion 26 starts the application correlated with the main portion data of the file (S12), and opens the main portion data of the file using this application (S13).

When the display image portion of the thumbnail image indicating the attachment of the text data is specified (the display image in S11), the control portion 26 starts the application correlated with the text data (S14), and opens the text data attached to the file using this application (S15).

This configuration allows the user to choose to open either the main portion data of the file or the text data attached to the file depending on which portion of the thumbnail image he specifies using the input device 3. For example, the user can open the text data directly and accesses the text data quickly by a manipulation as simple as specifying the display image portion.

Figure 6:
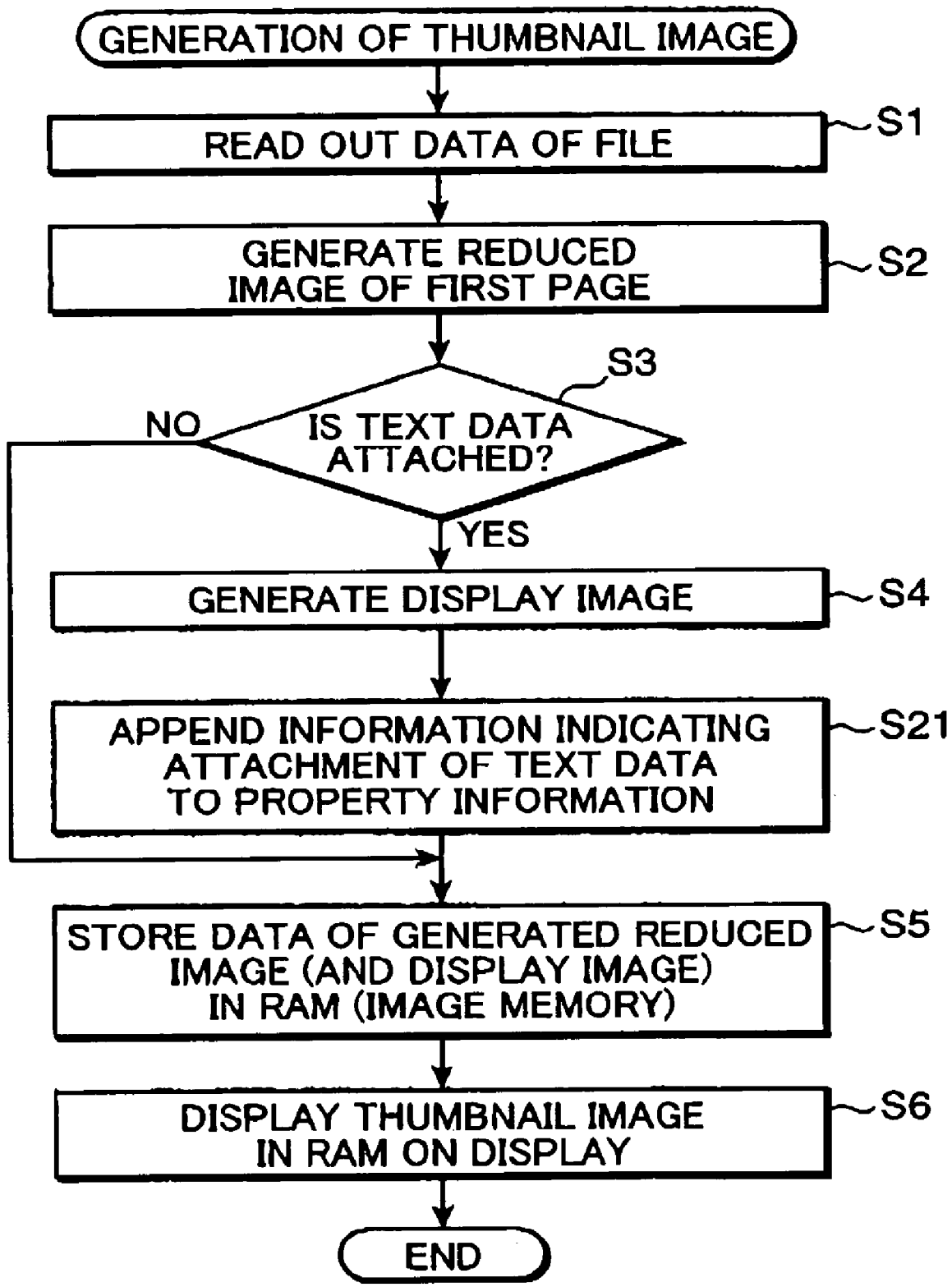
FIG. 6 is a flowchart showing a processing to provide a file with information indicating the attachment of text data.

A processing to provide a file with information indicating the attachment of the text data when the text data is attached to the file will now be described. FIG. 6 is a flowchart showing this processing. Like processing is labeled with like reference numerals with respect to FIG. 3, and descriptions of such processing are omitted herein.

When the text data is attached to a file stored in the storage device 6 or the like, in order to indicate this state, information indicating the attachment of the text data may be appended to the property information of the file when the display image is generated. In this case, as is shown in FIG. 6, when the judgment portion 22 judges the attachment of the text data to the file (YES in S3), the display image is generated (S4), and the state information appending portion 27 also provides the property information of the file with information indicating that the text data is attached to the file (S21). Alternatively, in the processing in S21, the state information appending portion 27 may generate a new file name containing a message (characters such as "OCRed") indicating the attachment of the text data as the name of the file.

In the description above, when the text data is attached to the file, the display image is generated (S21) and the information indicating the attachment of the text data is appended to the property information of the file. However, the display image generation processing (S21) may be omitted, and instead, only the processing to append information indicating the attachment of the text data to the property information of the file may be performed.

When configured in this manner, the user is able to know whether the text data is attached to each file from the property information or the file name information.

Figure 8C:
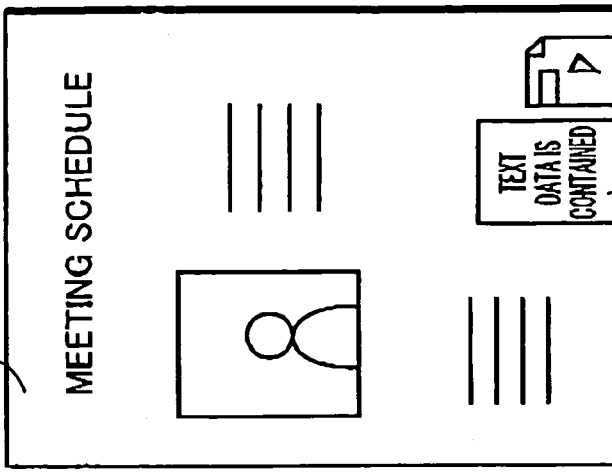
FIG. 8C is a view showing a thumbnail image having a display image indicating that the text data is contained in the data in the main portion of a file.
Figure 8B:
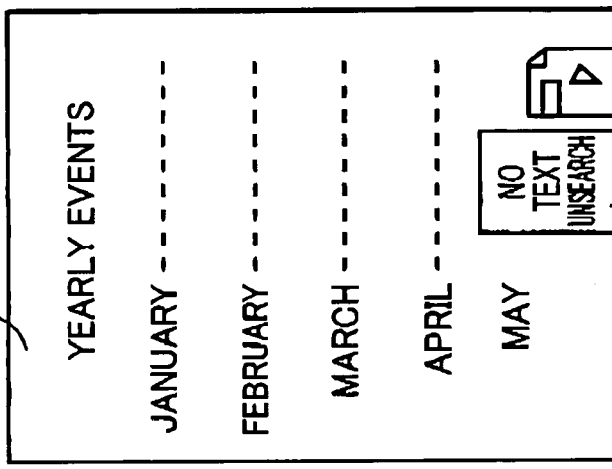
FIG. 8B is a view showing a thumbnail image indicating that neither the text data is attached to a file nor the text data is contained in data in the main portion of the file.
Figure 8A:
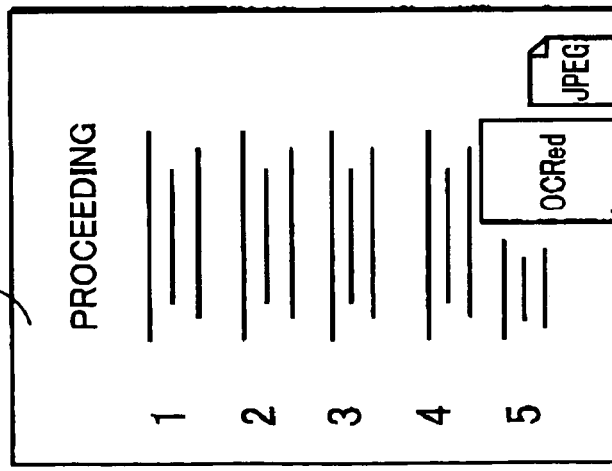
FIG. 8A is a view showing a thumbnail image having a display image indicating the attachment of text data to a file.

Another thumbnail image generation processing will now be described. FIG. 7 is a flowchart showing this processing. FIG. 8A is a view showing a thumbnail image having a display image indicating the attachment of the text data to the file. FIG. 8B is a thumbnail image having a display image indicating that neither the text data is attached to a file nor the text data is contained in the main portion data of the file. FIG. 8C is a view showing a thumbnail image having a display image indicating that the text data is contained in the main portion data of a file. Like processing is labeled with like reference numerals with respect to FIG. 3 and FIG. 6, and descriptions of such processing are omitted herein.

In this thumbnail image generation processing, a thumbnail image is generated to contain a state display image indicating in which format a file stored in the storage device 6 or the like is in a keyword searchable state. In this processing, the judgment portion 22 judges in which format each file stored in the storage device 6 or the like is in a keyword searchable state. The display image generation portion 23 then generates a state display image indicating the judgment result for each file. The display control portion 24 thus controls the display 7 to display the state display image and the reduced image as one thumbnail image.

For example, as is shown in FIG. 7, the judgment portion 22 judges the file state as being one of the following states: (1) the text data is attached to the file; (2) the main portion data of the file per se contains the text data; and (3) neither the text data is attached to the file nor the text data is contained in the main portion data of the file (S31). The display image generation portion 23 then generates a file state display image indicating the content of (1), (2), or (3) according to the judgment result (S34, S35, or S33). Subsequently, the state information appending portion 27 provides the information indicating the file state to the property information of the file (S21).

The display control portion 24 then stores the data of the reduced image and the data of the file state display image in the RAM 5 (image memory) (S5). The display control portion 24 then controls the display 7 to display, as are shown in FIGS. 8A, 8B, and 8C, a corresponding thumbnail image made of the file state display image and the reduced image (S6).

When configured in this manner, for each file stored in the storage device 6 or the like, the user can recognize whether the main portion data of the file per se is searchable in addition to whether the file is in a keyword searchable state. In other words, the user is able to understand in detail whether the file contains the text data in the main portion data and is therefore originally in the keyword searchable file format, or the main portion data of the file was originally in a keyword unsearchable state but is now in a keyword searchable state due to the attachment of the text data through the OCR processing by the OCR portion 30.

In the description above, the state information appending portion 27 provides the property information of the file with the information indicating the attachment of the text data to the file after the processing in S33, S34, or S35 (S21). This processing, however, can be omitted, and processing to provide the file state information to the file name may be performed instead of the processing in S21.

Figure 10:
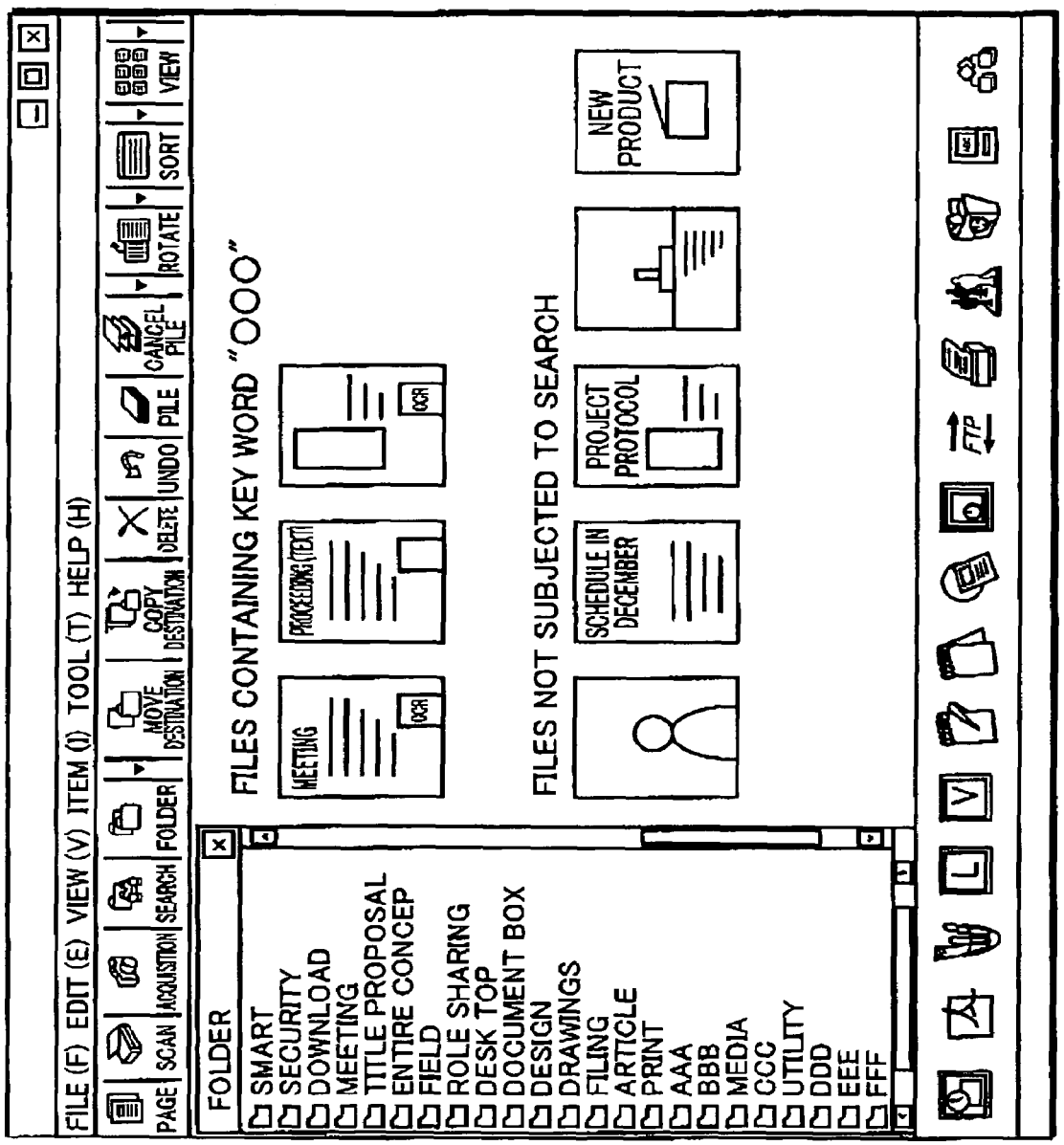
FIG. 10 is a view showing an example of a display screen showing the result of the keyword search.

A processing to conduct a search to find whether files stored in the storage device 6 or the like contain the keyword specified by the user will now be described. FIG. 9 is a flowchart showing a keyword search processing. FIG. 10 is a view showing an example of a display screen showing the result of the keyword search.

When the keyword to be searched for is inputted by the user's manipulation on the input device 3 and the search command and the keyword are accepted at the command acceptance portion 25 (YES in S51), the keyword search portion 28 conducts a search to find whether the keywords contained in the respective files stored in the storage device 6 or the storage medium 9 (S52).

The keyword search portion 28 detects a file containing the keyword inputted by the user (S53). When the search is conducted by the keyword search portion 28, the keyword is not detected unless the text data is attached to a file stored in the storage device 6 or the like or the text data is contained in the main portion data of the file. The non-searched file detection portion 29 thus detects files that do not contain the text data and are therefore excluded from a group of files subjected to the search (S54).

Subsequently, as is shown in FIG. 10, the display control portion 24 displays on the display 7 a list of the thumbnail images of the respective files containing the keyword and the thumbnail images of the respective files not subjected to the search (S55).

When configured in this manner, both the files containing the keyword and the files not subjected to the search are displayed on the display 7. This enables the user to understand whether the result is obtained by subjecting all the files to the keyword search or the result is obtained in the presence of files not subjected to the keyword search.

In addition, in a case where both the files to be subjected to the keyword search and the files not subjected to the keyword search are stored in the storage device 6 or the like, by performing the thumbnail display processing in FIG. 7 first and then the keyword search processing in FIG. 9, the user is able to understand from the indication on the corresponding thumbnail image whether a file was not subjected to the keyword search because it has not been OCRed or a file is originally keyword unsearchable because it is made of JPEG data of an image, such as a landscape.

It should be appreciated that the invention is not limited to the configurations of the embodiments above, and can be modified in various manners. For example, in the foregoing embodiment, the image display program is installed in a personal computer to use the personal computer as the image display apparatus. However, any device capable of executing the image display program can be used as the image display apparatus.

Also, it should be appreciated that the configurations and the processing shown in FIG. 1 through FIG. 10 are described by way of example, and the invention is not limited to these configurations and processing.

As described above, a signal bearing medium is recorded with an image display program. The image display program causes a computer to execute: a reduced image generation function of generating a reduced image indicating a content of a file stored in one of a storage portion of the computer and a storage medium readable by the computer; a judgment function of judging whether text data in text format is attached to a file stored in one of the storage portion of the computer and the storage medium; a display image generation function of generating a display image indicating attachment of the text data when the text data is judged to be attached to the file; and a display control function of displaying, on a display of the computer, a generated reduced image and a display image as a thumbnail image when the text data is judged to be attached to the file, and the generated reduced image as a thumbnail image when the text data is judged not to be attached to the file.

With this construction, when the text data in text format is attached to the file stored in the storage portion of the computer or the storage medium, both the reduced image indicating the content of the file and the display image indicating the attachment of the text data are displayed on the display portion of the computer as a thumbnail image. The user can understand the attachment of the text data to the file as soon as the user looks at the thumbnail image.

The image display program may preferably cause the computer to further execute: a command acceptance function of accepting a command from an operator to specify a part of the thumbnail image; and a control function of performing control to display a content of the text data attached to the file when the display image portion of the thumbnail image is specified by the accepted command, and to display contents of the data constituting the main portion of the file when the reduced image portion is specified by the accepted command.

This construction enables the user to easily see the content of the text data or the contents of the data constituting the main portion of the file by specifying the display image portion or the reduced image portion of the thumbnail image.

The image display program may preferably cause the computer to further execute: an appending function of appending information indicating that text data is attached to the file to one of property information and file name information of the file when the text data is judged to be attached to the file.

The information indicating that text data is attached to the file is appended to the property information or the file name information of the file if the text data is attached to the file. Accordingly, the user can readily see from the property information or the file name information whether the text data is attached to the file.

Also, a signal bearing medium is recorded with an image display program. The program causes a computer to execute: a reduced image generation function of generating a reduced image indicating a content of a file stored in one of a storage portion of the computer and a storage medium readable by the computer; a file state judgment function of judging which state a file stored in one of the storage portion of the computer and the storage medium is in, a state where text data in text format is attached to the file, a state where the text data in text format is contained in data constituting a main portion of the file, or a state where neither the text data is attached to the file nor the text data is contained in the data constituting the main portion of the file; a state display image generation function of generating a file state display image showing a judged file state; and a display control function of controlling a display portion of the computer to display the generated file state display image and the generated reduced image as a thumbnail image.

With this construction, it is judged which state the stored file falls in, and a file state display image is generated. The reduced image and the file state display image are displayed on the display of the computer as a thumbnail image. Accordingly, the user can understand the contents of the file as soon as the user looks at the thumbnail image.

The image display program may preferably cause the computer to further execute: a keyword search function of conducting search to find whether one of the text data contained in the data constituting a main portion of the file and the text data attached to the file contains a keyword specified by an operator; a non-searched file detection function of detecting a file which has not been subjected to the keyword search; a search result display control function of displaying a file found to contain a keyword through the keyword search; and a detection result display control function of displaying a result of the non-searched file detection.

With this construction, the keyword search is conducted to find whether the text data contained in the data constituting a main portion of the file or attached to the file contains a specified keyword. Also, a file which has not been subjected to the keyword search is detected. Accordingly, the user can easily see whether the text data or the main portion data is keyword-searchable or not.

Further, an image display apparatus comprises: a reduced image generation portion that generates a reduced image indicating a content of a file stored in one of a storage portion of a computer and a storage medium readable by the computer; a judgment portion that judges whether text data in text format is attached to the file stored in one of the storage portion of the computer and the storage medium; a display image generation portion that generates a display image indicating attachment of the text data when the judgment portion judges that the text data is attached to the file; and a display control portion that displays, on a display of the computer, an image generated by the reduced image generation portion and an image generated by the display image generation portion as a thumbnail image when the judgment portion judges that the text data is attached to the file, and a reduced image generated by the reduced image generation portion as a thumbnail image when the judgment portion judges that the text data is not attached to the file.

With this construction, when the text data in text format is attached to the file stored in the storage portion of the computer or the storage medium, both the reduced image indicating the content of the file and the display image indicating the attachment of the text data are displayed on the display portion of the computer as a thumbnail image. The user can understand the attachment of the text data to the file as soon as the user looks at the thumbnail image.

Preferably, the image display apparatus may be further provided with a command acceptance portion that accepts a command from an operator to specify a part of the thumbnail image; and a control portion that performs control to display a content of the text data attached to the file when a display image portion of the thumbnail image is specified by the command acceptance portion, and to display a content of data constituting a main portion of the file when a reduced image portion is specified by the command acceptance portion.

With this construction, the user can easily see the content of the text data or the contents of the data constituting the main portion of the file by specifying the display image portion or the reduced image portion of the thumbnail image.

Preferably, the image display apparatus may be further provided with an appending portion that appends information indicating that the text data is attached to the file to one of property information and file name information of the file when the judgment portion judges that the text data is attached to the file.

The information indicating that text data is attached to the file is appended to the property information or the file name information of the file if the text data is attached to the file. Accordingly, the user can readily see from the property information or the file name information whether the text data is attached to the file.

Further, an image display apparatus comprises: a reduced image generation portion that generates a reduced image indicating a content of a file stored in one of a storage portion of a computer and a storage medium readable by the computer; a file state judgment portion that judges which state a file stored in one of the storage portion of the computer and the storage medium is in, a state where text data in text format is attached to the file, a state where the text data in text format is contained in data constituting a main portion of the file, or a state where neither the text data is attached to the file nor the text data is contained in the data constituting the main portion of the file; a state display image generation portion that generates a file state display image showing a file state judged by the file state judgment portion; and a display control portion that controls a display of the computer to display a file state display image generated by the state display image generation portion and a reduced image generated by the reduced image generation portion as a thumbnail image.

With this construction, it is judged which state the stored file falls in, and a file state display image is generated. The reduced image and the file state display image are displayed on the display of the computer as a thumbnail image. Accordingly, the user can understand the contents of the file as soon as the user looks at the thumbnail image.

Preferably, the image display apparatus may be further provided with a keyword search portion that conducts search to find whether one of the text data contained in the data constituting a main portion of the file and the text data attached to the file contains a keyword specified by an operator; a non-searched file detection portion that detects a file which has not subjected to the search conducted by the keyword search portion; a search result display control portion that displays a file found to contain the keyword through the search conducted by the keyword search portion; and a detection result display control portion that displays a detection result obtained by the non-searched file detection portion.

With this construction, the keyword search is conducted to find whether the text data contained in the data constituting a main portion of the file or attached to the file contains a specified keyword. Also, a file which has not been subjected to the keyword search is detected. Accordingly, the user can easily see whether the text data or the main portion data is keyword-searchable or not.

This application is based on patent application No. 2004-381697 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A computer storage medium bearing an image display program which causes a computer to execute:

a reduced image generation function of generating a reduced image indicating a content of a file stored in one of a storage portion of the computer or a storage medium readable by the computer;

a judgment function of judging whether text data in text format converted from data of the file is attached to a file stored in one of the storage portion of the computer or the storage medium;

a display image generation function of generating a display image indicating whether or not the text data is attached when the text data is judged to be attached to the file; and a display control function of displaying, on a display of the computer, a reduced image generated by the reduced image generation function and a display image generated by the display image generation function, indicating that the file is in a keyword searchable state, and indicating that the text data is attached to the file, as a thumbnail image when the text data is judged to be attached to the file, and the reduced image generated by the reduced image generation function and a display image generated by the display image generation function and indicating that the file is in a keyword unsearchable state as a thumbnail image when the text data is judged not to be attached to the file.

2. The computer storage medium bearing an image display program according to claim 1, wherein the image display program causes the computer to further execute:

a command acceptance function of accepting a command from an operator to specify a part of the thumbnail image; and a control function of performing control to display a content of the text data attached to the file when the display image portion of the thumbnail image is specified by the accepted command, and to display contents of the data constituting the main portion of the file when the reduced image portion is specified by the accepted command.

3. The computer storage medium bearing an image display program according to claim 1, wherein the program causes the computer to further execute:

an appending function of appending information indicating that text data is attached to the file to one of property information and file name information of the file when the text data is judged to be attached to the file.

4. The computer storage medium bearing an image display program according to claim 2, wherein the program causes the computer to further execute:

an appending function of appending information indicating that text data is attached to the file to one of property information and file name information of the file when the text data is judged to be attached to the file.

5. A computer storage medium bearing an image display program that causes a computer to execute:

a reduced image generation function of generating a reduced image indicating a content of a file stored in one of a storage portion of the computer or a storage medium readable by the computer;

a file state judgment function of judging which state a file stored in one of the storage portion of the computer or the storage medium is in, a state where text data in text format converted from data of the file is attached to the file, a state where a PDF file including the text data in text format is contained in data constituting a main portion of the file, or a state where neither the text data is attached to the file nor the PDF file including the text data is contained in the data constituting the main portion of the file;

a state display image generation function of generating a file state display image showing a Judged file state; and a display control function of controlling a display portion of the computer to display the generated file state display image and the generated reduced image as a thumbnail image.

6. The computer storage medium bearing an image display program according to claim 5, wherein the image display program causes the computer to further execute:
a keyword search function of conducting a search to find whether one of the text data contained in the data constituting a main portion of the file and the text data attached to the file contains a keyword specified by an operator;
a non-searched file detection function of detecting a file which has not been subjected to the keyword search;
a search result display control function of displaying a file found to contain a keyword through the keyword search; and
a detection result display control function of displaying a result of the non-searched file detection.

7. A display control apparatus that controls a display of a computer, comprising:
a storage device that stores an image display program therein;
a CPU that reads out the image display program from the storage device and performs processing according to the image display program which causes the CPU to function as:
a reduced image generation portion that generates a reduced image indicating a content of a file stored in one of a storage portion of the computer or a storage medium readable by the computer;
a judgment portion that judges whether text data in text format converted from data of the file is attached to the file stored in one of the storage portion of the computer or the storage medium;
a display image generation portion that generates a display image indicating whether or not the text data is attached when the judgment portion judges that the text data is attached to the file; and
a display control portion that displays, on the display of the computer, an image generated by the reduced image generation portion and an image generated by the display image generation portion indicating that the file is in a keyword searchable state, and indicating that the text data is attached to the file, as a thumbnail image when the judgment portion judges that the text data is attached to the file, and a reduced image generated by the reduced image generation portion and a display image generated by the display image generation portion and indicating that the file is in a keyword unsearchable state as a thumbnail image when the judgment portion judges that the text data is not attached to the file.

8. The display control apparatus according to claim 7, wherein the CPU further functions as:
a command acceptance portion that accepts a command from an operator to specify a part of the thumbnail image; and
a control portion that performs control to display a content of the text data attached to the file when a display image portion of the thumbnail image is specified by the command acceptance portion, and to display a content of data constituting a main portion of the file when a reduced image portion is specified by the command acceptance portion.

9. The display control apparatus according to claim 7, wherein the CPU further functions as:
an appending portion that appends information indicating that the text data is attached to the file to one of property information and file name information of the file when the judgment portion judges that the text data is attached to the file.

10. The display control apparatus according to claim 8, wherein the CPU further functions as:
an appending portion that appends information indicating that the text data is attached to the file to one of property information and file name information of the file when the judgment portion judges that the text data is attached to the file.

11. A display control apparatus that controls a display of a computer, comprising:
a storage device that stores an image display program therein;
a CPU that reads out the image display program from the storage device and performs processing according to the image display program which causes the CPU to function as:
a reduced image generation portion that generates a reduced image indicating a content of a file stored in one of a storage portion of the computer or a storage medium readable by the computer;
a file state judgment portion that judges which state a file stored in one of the storage portion of the computer or the storage medium is in, a state where text data in text format converted from the data of the file is attached to the file, a state where a PDF file including the text data in text format is contained in data constituting a main portion of the file, or a state where neither the text data is attached to the file nor the PDF file including the text data is contained in the data constituting the main portion of the file;
a state display image generation portion that generates a file state display image showing a file state judged by the file state judgment portion; and
a display control portion that controls the display of the computer to display a file state display image generated by the state display image generation portion and a reduced image generated by the reduced image generation portion as a thumbnail image.

12. The display control apparatus according to claim 11, wherein the CPU further functions as:
a keyword search portion that conducts a search to find whether one of the text data contained in the data constituting a main portion of the file and the text data attached to the file contains a keyword specified by an operator;
a non-searched file detection portion that detects a file which has not subjected to the search conducted by the keyword search portion;
a search result display control portion that displays a file found to contain the keyword through the search conducted by the keyword search portion; and
a detection result display control portion that displays a detection result obtained by the non-searched file detection portion.

* * * * *